US012548709B2

(12) United States Patent
Matsuba et al.

(10) Patent No.: US 12,548,709 B2
(45) Date of Patent: Feb. 10, 2026

(54) COIL COMPONENT

(71) Applicant: Murata Manufacturing Co., Ltd., Kyoto-fu (JP)

(72) Inventors: Reiichi Matsuba, Nagaokakyo (JP); Yoshifumi Maki, Nagaokakyo (JP)

(73) Assignee: Murata Manufacturing Co., Ltd., Kyoto-fu (JP)

( * ) Notice: Subject to any disclaimer, the term of this patent is extended or adjusted under 35 U.S.C. 154(b) by 1077 days.

(21) Appl. No.: 17/455,682

(22) Filed: Nov. 19, 2021

(65) Prior Publication Data

US 2022/0165487 A1 May 26, 2022

(30) Foreign Application Priority Data

Nov. 26, 2020 (JP) ................................ 2020-196043

(51) Int. Cl.

*H01F 27/29* (2006.01)
*H01F 17/04* (2006.01)
*H01F 27/28* (2006.01)

(52) U.S. Cl.

CPC ......... *H01F 27/292* (2013.01); *H01F 17/045* (2013.01); *H01F 27/2823* (2013.01)

(58) Field of Classification Search

CPC ............... H01F 27/045; H01F 27/2823; H01F 2017/0093; H01F 27/292

See application file for complete search history.

(56) References Cited

U.S. PATENT DOCUMENTS

2018/0286568 A1* 10/2018 Suzuki .................. H01F 41/122
2019/0228899 A1* 7/2019 Maki ......................... H01G 4/30
2019/0237246 A1* 8/2019 Wakabayashi ...... H01F 27/2804
2020/0402699 A1* 12/2020 Kim ......................... H01F 17/04
2021/0257143 A1* 8/2021 Yoshino .............. H01F 27/2828
2021/0280359 A1* 9/2021 Yoshino .............. H01F 27/2823
2022/0165487 A1* 5/2022 Matsuba ............... H01F 17/045
2023/0411068 A1* 12/2023 Takagi .................... H01F 17/04

FOREIGN PATENT DOCUMENTS

CN 110024061 A 7/2019
JP 2005-317577 A 11/2005
WO 2012/121141 A1 9/2012
WO 2015/178264 A1 11/2015

* cited by examiner

*Primary Examiner* — Shawki S Ismail

(74) *Attorney, Agent, or Firm* — Studebaker Brackett PLLC

(57) ABSTRACT

A coil component includes a core, terminal electrodes, and a wire. The core includes a winding core and a pair of flanges. Each flange of the pair of flanges is disposed on the corresponding one of two ends of the winding core. The terminal electrodes are at the flanges. The wire is wound around the winding core. Two ends of the wire are electrically connected to the respective terminal electrodes. The terminal electrodes each include an electrode main body part and an anchor part that extends from the electrode main body part and is lodged in the core.

16 Claims, 9 Drawing Sheets

COIL COMPONENT

CROSS-REFERENCE TO RELATED APPLICATION

This application claims benefit of priority to Japanese Patent Application No. 2020-196043, filed Nov. 26, 2020, the entire content of which is incorporated herein by reference.

BACKGROUND

Technical Field

The present disclosure relates to a coil component.

Background Art

Coil components known in the art include the one disclosed in International Publication No. 2015/178264. The coil component includes a core, terminal electrodes, and wires. The core includes a winding core and a pair of flanges. Each flange of the pair of flanges is disposed on the corresponding one of two ends of the winding core. The terminal electrodes are at the flanges. The wires are wound around the winding core, and two ends of each of the wires are electrically connected to the respective terminal electrodes.

The downside of the coil component known in the art, and in particular the downside of such a coil component of miniature size, is that the terminal electrodes are not necessarily adequately fixed to the core. The terminal electrodes can come off the core when the coil component is mounted onto a mounting substrate. As a result, it is not ensured that the coil component is adequately fixed to the mounting substrate.

SUMMARY

Therefore, the present disclosure provides a coil component whose terminal electrodes are securely fixed to a core.

According to an aspect of the present disclosure, a coil component includes a core, terminal electrodes, and a wire. The core includes a winding core and a pair of flanges. Each flange of the pair of flanges is disposed on the corresponding one of two ends of the winding core. The terminal electrodes are at the flanges. The wire is wound around the winding core. Two ends of the wire are electrically connected to the respective terminal electrodes. The terminal electrodes each include an electrode main body part and an anchor part that extends from the electrode main body part and is lodged in the core.

This embodiment is advantageous in that with the addition of the anchor part lodged in the core, each terminal electrode is securely fixed to the core. Each terminal electrode securely fixed to the core is less likely to come off the core when the coil component is mounted onto a mounting substrate. It is thus ensured that the coil component is adequately fixed to the mounting substrate.

According to a preferred embodiment of the coil component, the anchor part may be caught in gaps between particles constituting the core.

This embodiment is advantageous in that each terminal electrode is more securely fixed to the core.

According to another preferred embodiment of the coil component, the anchor part may have a mesh pattern.

This embodiment is advantageous in that each terminal electrode is more securely fixed to the core.

According to still another preferred embodiment of the coil component, the anchor part may extend outside a peripheral surface of the electrode main body part when viewed in a thickness direction of the electrode main body part.

The thickness direction of the electrode main body part is orthogonal to a surface of the core having the electrode main body part disposed thereon.

This embodiment is advantageous in that with the anchor part extending outside the peripheral surface of the electrode main body part, at least part of an interface between the electrode main body and the core is covered by the anchor part from the side on which the peripheral surface is located. A plating layer may be formed on the electrode main body part in such a way as to reduce the possibility that a plating solution flowing along the peripheral surface of the electrode main body part will infiltrate the interface between the electrode main body part and the core. As a result, the occurrence of solder popping or other mounting defects is reduced such that the electrode main body part is less likely to come off the core.

According to still another preferred embodiment of the coil component, the anchor part may be at a level below an upper surface of the electrode main body part in the thickness direction of the electrode main body part. The upper surface is located on an upper side in the thickness direction of the electrode main body part.

This embodiment is advantageous in that the anchor part at a level below the upper surface of the electrode main body part adds no extra thickness to the terminal electrode.

According to still another preferred embodiment of the coil component, the anchor part may be at a level below a surface of the core in the thickness direction of the electrode main body part.

This embodiment is advantageous in that the anchor part at a level below the surface of the core adds no extra planar dimension to the terminal electrode at a level above the surface of the core. For example, a solder fillet is kept from spreading when the coil component is mounted onto a mounting substrate. This leads to a reduction in the footprint of the coil component.

According to still another preferred embodiment of the coil component, an upper surface of the electrode main body part may have a recess. The upper surface is located on an upper side in a thickness direction of the electrode main body part.

This embodiment is advantageous in that the recess in the upper surface of the electrode main body part adds an extra surface area to the upper surface of the electrode main body part. When a plating layer is formed on the electrode main body part, the upper surface of the electrode main body part has a better chance of contacting the medium in the plating solution, thus enabling a reduction in plating time. Furthermore, the adhesion of the plating layer to the electrode main body part is enhanced such that the plating layer will not easily come off.

According to still another preferred embodiment of the coil component, the flanges may each have an inner end surface facing the winding core and an outer end surface opposite in direction to the inner end surface. Each of the terminal electrodes may include an outer end surface electrode portion on the outer end surface of the corresponding one of the flanges. The outer end surface electrode portion may include the electrode main body part and the anchor part.

The outer end surface electrode portion may be formed by screen printing. In this case, this embodiment is advantageous in that the anchor part may be easily formed in such a manner that the outer end surface of each flange is well plastered with a conductive paste applied by using a squeegee firmly pressed against the outer end surface, with a conductive paste applied at a high printing speed, or with a conductive paste having a low viscosity.

According to still another preferred embodiment of the coil component, the outer end surface electrode portion may include a first layer and a second layer. The first layer may be in contact with the core and may be overlaid with the second layer. The first layer may include the electrode main body part and the anchor part.

The first layer of the outer end surface electrode portion may be formed by screen printing. In this case, this embodiment provides ease of forming the anchor part.

Other features, elements, characteristics and advantages of the present disclosure will become more apparent from the following detailed description of preferred embodiments of the present disclosure with reference to the attached drawings.

DETAILED DESCRIPTION

Hereinafter, a coil component according to an aspect of the present disclosure will be described in detail by way of embodiments with reference to the accompanying drawings. The drawings may be partially schematic; that is, the drawings may not be dimensionally accurate or may not be drawn to scale.

First Embodiment

Figure 1:
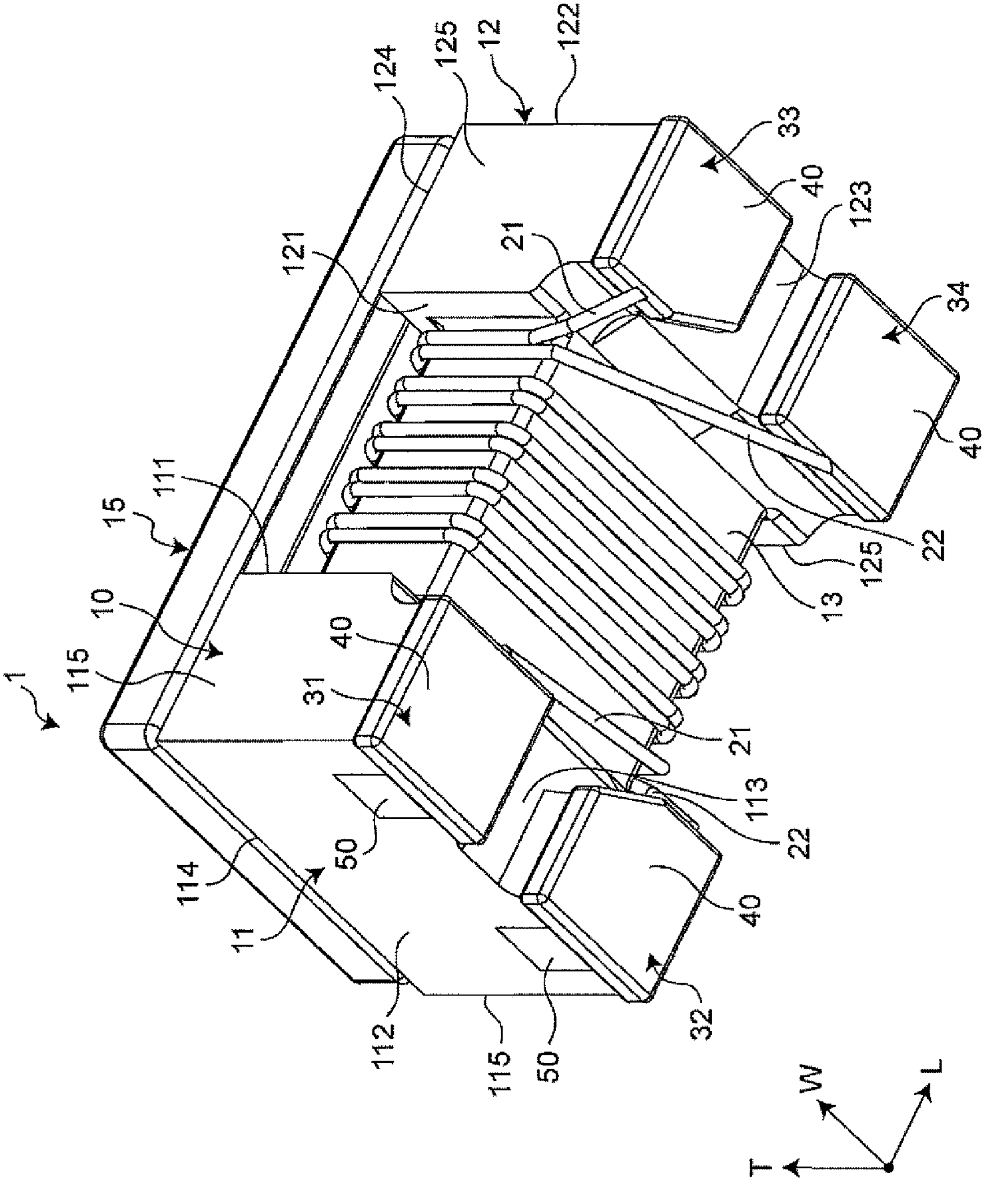
FIG. 1 is a perspective view of a coil component in a first embodiment, illustrating the coil component seen from below.

FIG. 1 is a perspective view of a coil component in a first embodiment, illustrating the coil component seen from below. Referring to FIG. 1, a coil component 1 includes a core 10, a first wire 21, a second wire 22, a first terminal electrode 31, a second terminal electrode 32, a third terminal electrode 33, a fourth terminal electrode 34, and a magnetic plate 15. The first wire 21 and the second wire 22 are wound around the core 10. The first terminal electrode 31, the second terminal electrode 32, the third terminal electrode 33, and the fourth terminal electrode 34 are at the core 10 and are electrically connected with the first wire 21 and the second wire 22. The magnetic plate 15 is fixed to the core 10.

The core 10 extends in one direction and includes a winding core 13, a first flange 11, and a second flange 12. The first wire 21 and the second wire 22 are wound around the winding core 13. The first flange 11 and the second flange 12 are disposed on a first end and a second end, respectively, of the winding core 13 in a direction in which the winding core 13 extends. The first flange 11 and the second flange 12 extend out in a direction orthogonal to the direction in which the winding core 13 extends. The direction in which the winding core 13 extends is also referred to as an axial direction of the winding core 13. The core 10 is preferably made of a magnetic material, such as sintered ferrite or molded resin containing magnetic powder, or may be made of a non-magnetic material, such as alumina or resin.

The coil component 1 is mounted onto a mounting substrate in such a manner that a bottom surface of the core 10 faces the mounting substrate. The core 10 has a top surface located opposite the bottom surface thereof. The axial direction of the winding core 13 is denoted by L. The direction in which the bottom surface of the core 10 extends perpendicularly to the L direction is denoted by W. The bottom surface and the top surface of the core 10 are opposite in a direction denoted by T. The T direction is orthogonal to the L direction and to the W direction. The positive side in the T direction is herein referred to as an upper side, and the negative side in the T direction is herein referred to as a lower side. In other words, the side on which the bottom surface of the core 10 is located is the lower side in the vertical direction, and the top surface of the core 10 is located on the upper side in the vertical direction. The L direction, the W direction, and the T direction may be hereinafter also referred to as a length direction, a width direction, and a height direction, respectively, of the core 10.

The first flange 11 has an inner end surface 111, an outer end surface 112, a bottom surface 113, a top surface 114, and two side surfaces 115. The inner end surface 111 faces the winding core 13. The outer end surface 112 is opposite in direction to the inner end surface 111. The bottom surface 113 forms a connection between the inner end surface 111 and the outer end surface 112. The coil component 1 is mounted onto a mounting substrate in such a manner that the bottom surface 113 faces the mounting substrate. The top surface 114 is opposite in direction to the bottom surface 113. The side surfaces 115 each form a connection between the inner end surface 111 and the outer end surface 112 and a connection between the bottom surface 113 and the top surface 114.

The second flange 12 has an inner end surface 121, an outer end surface 122, a bottom surface 123, a top surface 124, and two side surfaces 125. The inner end surface 121 faces the winding core 13. The outer end surface 122 is opposite in direction to the inner end surface 121. The bottom surface 123 forms a connection between the inner end surface 121 and the outer end surface 122. The coil component 1 is mounted onto a mounting substrate in such a manner that the bottom surface 123 faces the mounting substrate. The top surface 124 is opposite in direction to the bottom surface 123. The side surfaces 125 each form a connection between the inner end surface 121 and the outer end surface 122 and a connection between the bottom surface 123 and the top surface 124.

The magnetic plate 15 is fixed to the pair of flanges. More specifically, the magnetic plate 15 is laid over and between the first flange 11 and the second flange 12. The magnetic plate 15 is stuck on the top surface 114 of the first flange 11 and on the top surface 124 of the second flange 12 with an adhesive. The core 10 and the magnetic plate 15 may be made of the same material. Both the core 10 and the magnetic plate 15 exhibit magnetic properties and thus constitute a closed magnetic circuit, which leads to enhanced efficiency in terms of inductance value. With the resultant increase in magnetic efficiency, a desired inductance value may be achieved by using a few wires. The magnetic plate 15 of the coil component in the present embodiment is optional.

The first flange 11 has two legs on the side on which the bottom surface 113 is located. The first terminal electrode 31 is at one of the legs, and the second terminal electrode 32 is at the other leg. The second flange 12 has two legs on the side on which the bottom surface 123 is located. Each of the third terminal electrode 33 and the fourth terminal electrode 34 is at the corresponding one of the legs or, more specifically, the first terminal electrode 31 and the third terminal electrode 33 are at the respective legs located on the same side, and the second terminal electrode 32 and the fourth terminal electrode 34 are at the respective legs located on the same side. As illustrated in FIG. 1, the bottom surfaces 113 and 123 each include bottom faces of the corresponding legs and side faces and a bottom face of a crotch portion between the legs.

The first wire 21 and the second wire 22 are conducting wires that are made of metal, such as copper, and covered with an insulating of resin, such as polyurethane or polyamideimide. One end of the first wire 21 is electrically connected to the first terminal electrode 31, and the other end of the first wire 21 is electrically connected to the third terminal electrode 33. One end of the second wire 22 is electrically connected to the second terminal electrode 32, and the other end of the second wire 22 is electrically connected to the fourth terminal electrode 34. The first wire 21 and the second wire 22 are connected to the corresponding ones of the first terminal electrode 31, the second terminal electrode 32, the third terminal electrode 33, and the fourth terminal electrode 34 by, for example, thermocompression bonding, brazing, or welding.

The first wire 21 and the second wire 22 are wound in the same direction around the winding core 13. Entry by differential signals or other signals of opposite phases into the first wire 21 and the second wire 22 causes the magnetic flux produced by the first wire 21 and the magnetic flux produced by the second wire 22 to cancel each other out. Consequently, the functioning of the coil component 1 acting as an inductor is diminished such that these signals pass through the coil component 1. Meanwhile, entry by extraneous noise or other in-phase signals into the first wire 21 and the second wire 22 causes the magnetic flux produced by the first wire 21 and the magnetic flux produced by the second wire 22 to strengthen each other. Consequently, the functioning of the coil component 1 acting as an inductor is enhanced such that the passage of the noise is blocked. That is, the coil component 1 acts as a common mode choke coil, which reduces transmission loss for differential (mode) signals and attenuates common mode signals such as extraneous noise.

The coil component 1 is mounted onto a mounting substrate in such a manner that the bottom surface 113 of the first flange 11 and the bottom surface 123 of the second flange 12 face the mounting substrate. In this state, the axis of the winding core 13 is parallel to a principal surface of the mounting substrate. With the winding axis of the first wire 21 and the winding axis of the second wire 22 being parallel to the mounting substrate, the coil component 1 is of a transverse type.

Figure 2:
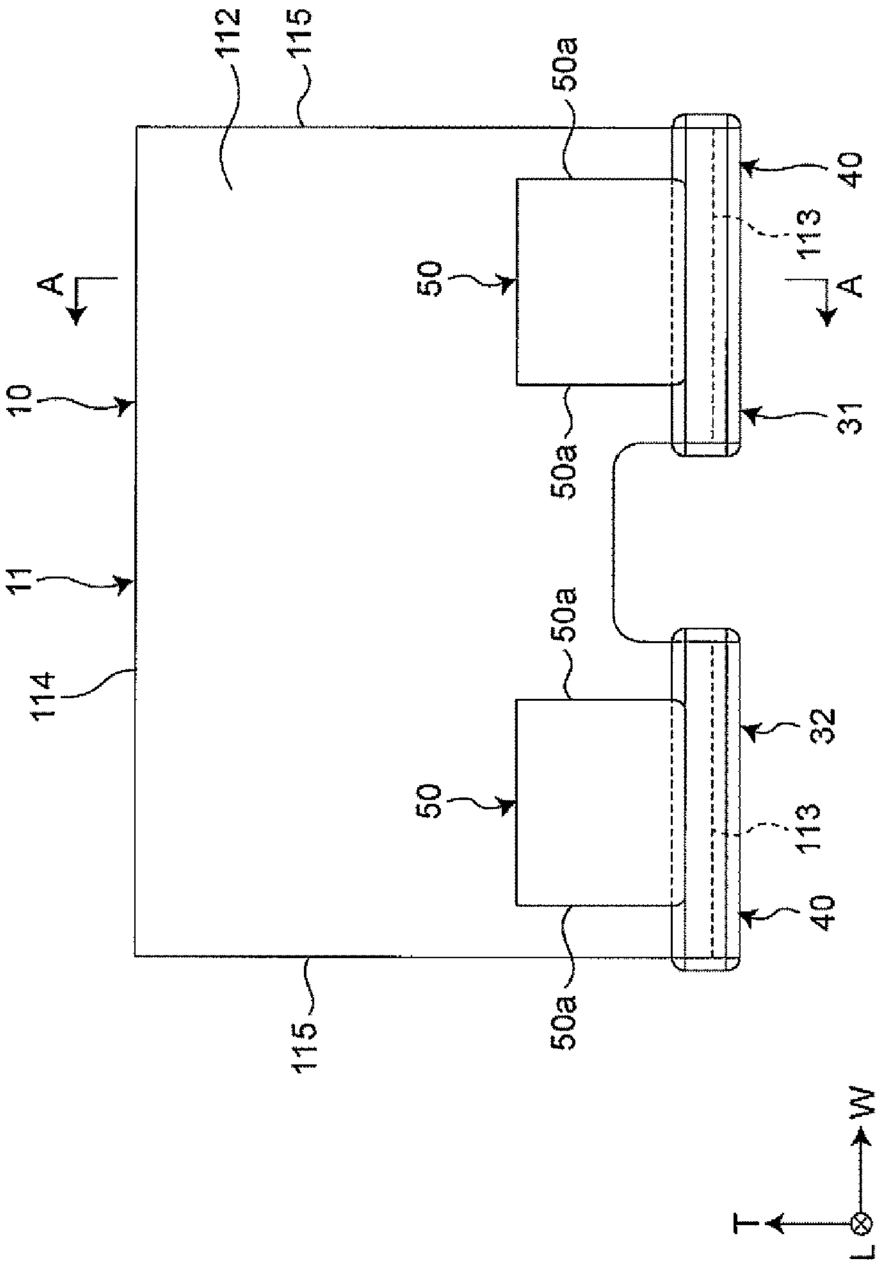
FIG. 2 illustrates the coil component seen in an L direction.

FIG. 2 illustrates the coil component seen in the L direction. For convenience of illustration, the magnetic plate 15 omitted from FIG. 2.

Referring to FIG. 2, the first terminal electrode 31 includes a bottom surface electrode portion 40 and an outer end surface electrode portion 50. The bottom surface electrode portion 40 extends over a region including at least the corresponding part of the bottom surface 113 of the first flange 11. The outer end surface electrode portion 50 is disposed on the outer end surface 112 of the first flange 11. Likewise, the second terminal electrode 32, the third terminal electrode 33, and the fourth terminal electrode 34 include their respective bottom surface electrode portions 40 and their respective outer end surface electrode portions 50. The following describes the first terminal electrode 31, and the corresponding description of the second terminal electrode 32, the third terminal electrode 33, and the fourth terminal electrode 34 will be omitted.

The bottom surface electrode portion 40 entirely covers a region being part of the bottom surface 113 and corresponding to the leg. The bottom surface electrode portion 40 also covers a region being part of the inner end surface 111 and adjoining the bottom surface 113, a region being part of the outer end surface 112 and adjoining the bottom surface 113, and a region being part of one of the side surfaces 115 and adjoining the bottom surface 113. The outer end surface electrode portion 50 is connected to the bottom surface electrode portion 40. The outer end surface electrode portion 50 has two edges 50*a*, which are opposite in the width direction (i.e., in the W direction) as are the side surfaces 115 of the first flange 11. The edges 50*a* of the outer end surface electrode portion 50 are discretely located away from the side surfaces 115 of the first flange 11. The outer end surface electrode portion 50 discretely located away from the side surfaces 115 of the first flange 11 guards against solder wicking on the side surfaces 115 of the first flange 11, thus eliminating or reducing the possibility that a solder fillet will spread in the W direction of the coil component 1. This layout offers a reduction in the footprint of the coil component 1 in the W direction.

Figure 3:
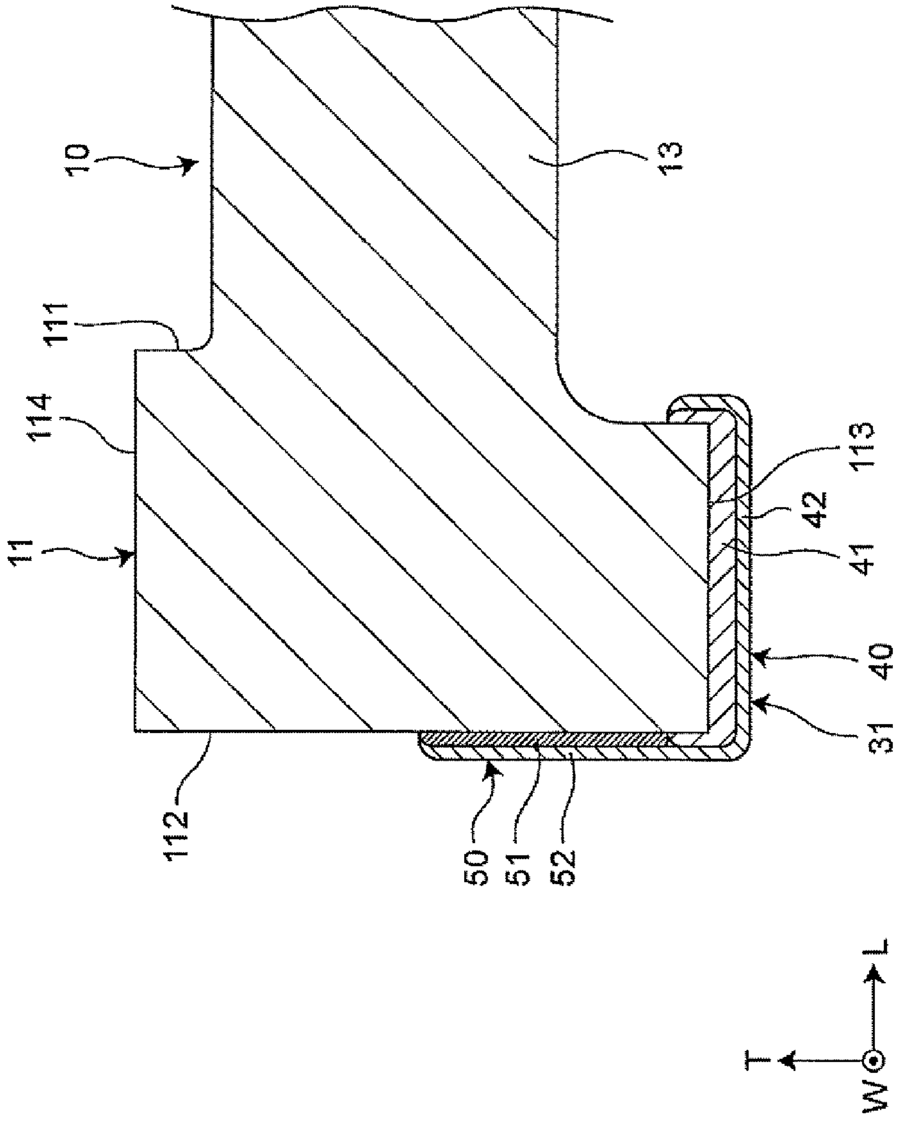
FIG. 3 is a sectional view taken along line A-A in FIG. 2.

FIG. 3 is a sectional view taken along line A-A in FIG. 2. Referring to FIG. 3, the bottom surface electrode portion 40 includes a first layer 41 and a second layer 42. The first layer 41 is in contact with the core 10 and is overlaid with the second layer 42. The first layer 41 may be made of Ag paste containing Ag, Si, and resin. For example, the Ag paste is applied to the bottom surface 113 of the first flange 11 by dip coating and is then fired. The second layer 42 may include a Cu layer, an Ni layer, and an Sn layer. For example, Cu, Ni, and Sn are deposited in this order on the first layer 41 by electrolytic plating. The two legs of the first flange 11 are provided with their respective bottom surface electrode portions 40. These two separate bottom surface electrode portions 40 on the respective legs can be easily formed by dip coating.

The outer end surface electrode portion 50 includes a first layer 51 and a second layer 52. The first layer 51 is in contact with the core 10 and is overlaid with the second layer 52. The first layer 51 may be made of a conductive paste containing Ag or Cu. For example, the conductive paste is applied to the outer end surface 112 of the first flange 11 by screen printing under predetermined conditions. The second layer 52 may include a Cu layer, an Ni layer, and an Sn layer. For example, Cu, Ni, and Sn are deposited in this order on the first layer 51 by electrolytic plating.

The first layer 51 of the outer end surface electrode portion 50 is in contact with the first layer 41 of the bottom surface electrode portion 40. The first layer 51 of the outer end surface electrode portion 50 is isolated from the bottom surface 113 of the first flange 11 such that the first layer 51 does not overlap the first layer 41 of the bottom surface electrode portion 40. An increase in the thickness of the first terminal electrode 31 is inhibited accordingly. There may be an overlap between an end portion of the first layer 51 of the outer end surface electrode portion 50 and an end portion of the first layer 41 of the bottom surface electrode portion 40.

The second layer 52 of the outer end surface electrode portion 50 and the second layer 42 of the bottom surface electrode portion 40 adjoin each other so as to be monolithic. The reason for this is that the second layer 52 of the outer end surface electrode portion 50 and the second layer 42 of the bottom surface electrode portion 40 are formed at the same time by plating. For convenience in writing, a portion that is part of the second layers 42 and 52 formed monolithically by means of plating and covers the first layer 51 of the outer end surface electrode portion 50 is referred to as the second layer 52 of the outer end surface electrode portion 50. The other portion covers the first layer 41 of the bottom surface electrode portion 40 and is referred to as the second layer 42 of the bottom surface electrode portion 40. In some embodiments, the second layers 42 and 52 may be disposed with a space therebetween.

Figure 4:
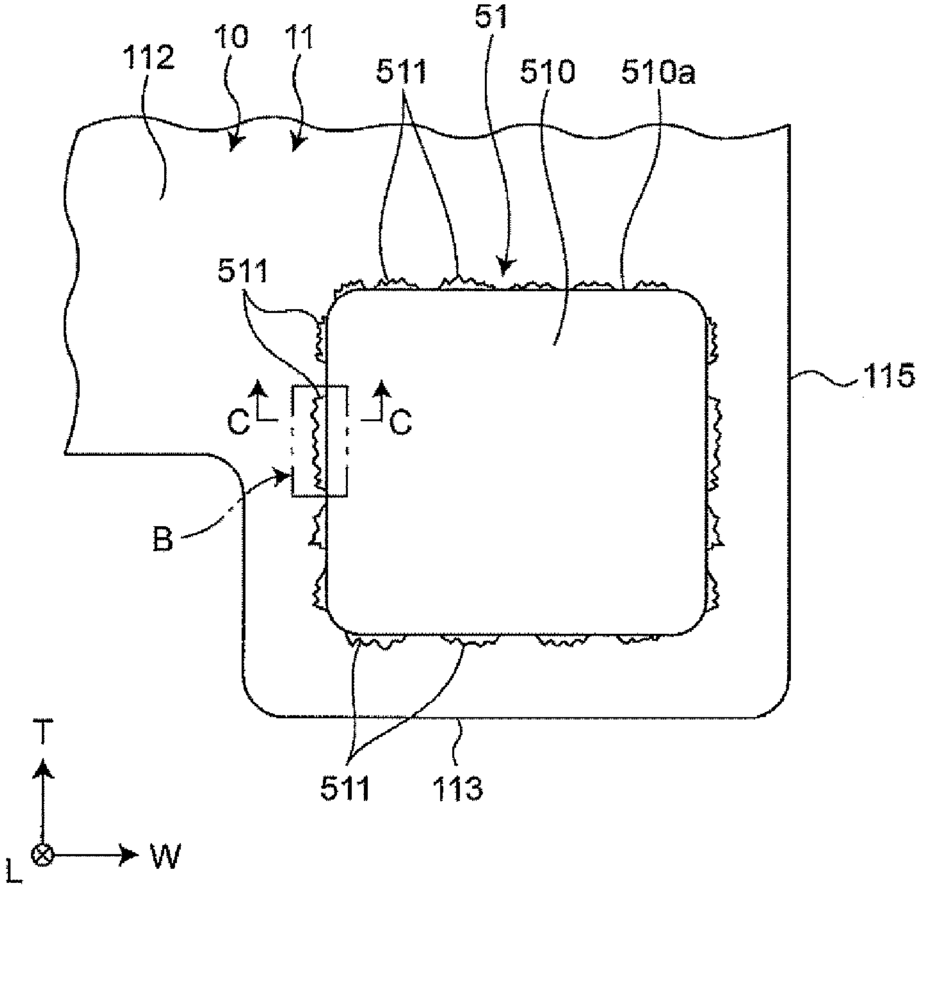
FIG. 4 illustrates a first layer of an outer end surface electrode portion seen in the L direction.

FIG. 4 illustrates the coil component seen in the L direction. For convenience of illustration, only the first layer 51 of the outer end surface electrode portion 50 is shown as the first terminal electrode 31 in FIG. 4.

Referring to FIG. 4, the first layer 51 includes an electrode main body part 510 and an anchor part 511. The electrode main body part 510 is formed by screen printing, using a mask. The electrode main body part 510 is the greater part (principal part) of the first layer 51. The anchor part 511 extends from the electrode main body part 510 and is lodged in the core 10 or, more specifically, in the first flange 11.

With the addition of the anchor part 511, the first terminal electrode 31 is securely fixed to the core 10. The first terminal electrode 31 securely fixed to the core 10 is less likely to come off the core 10 when the coil component 1 is mounted onto a mounting substrate. It is thus ensured that the coil component 1 is adequately fixed to the mounting substrate.

The outer end surface electrode portion 50 may be formed by screen printing. As part of the outer end surface electrode portion 50, the anchor part 511 may be easily formed in such a manner that the outer end surface 112 of the first flange 11 is well plastered with a conductive paste applied by using a squeegee firmly pressed against the outer end surface 112, with a conductive paste applied at a high printing speed, or with a conductive paste having a low viscosity.

The first layer 51 of the outer end surface electrode portion 50 may be formed by screen printing. As part of the first layer 51, the anchor part 511 may be easily formed accordingly.

Figure 5:
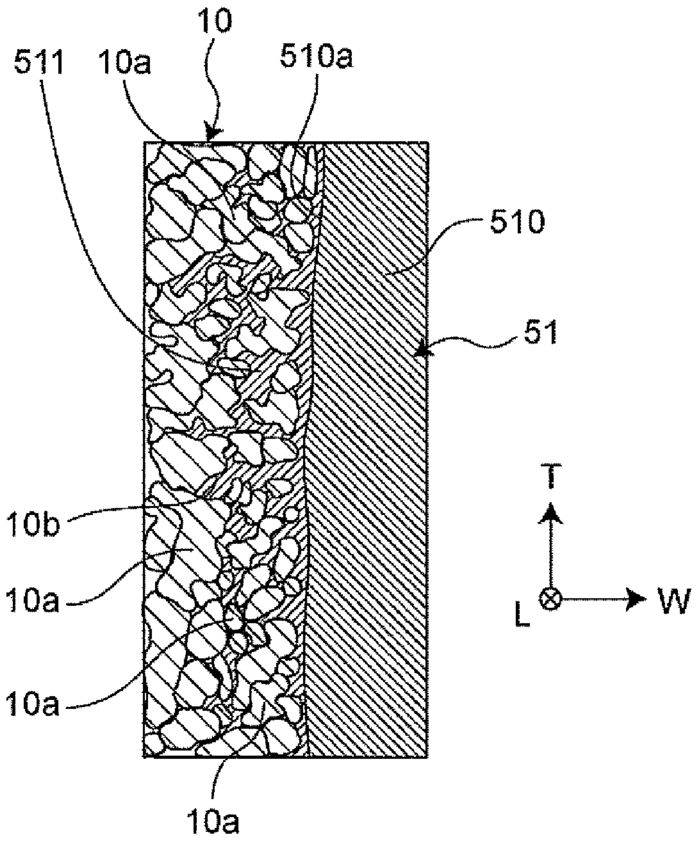
FIG. 5 is a simplified enlarged view of a section denoted by B in FIG. 4.

FIG. 5 is a simplified enlarged view of a section denoted by B in FIG. 4. For convenience of illustration in FIG. 5, particles constituting the anchor part 511 are hatched with oblique lines of one kind, and particles constituting the core 10 are hatched with oblique lines of another kind.

Referring to FIG. 5, the anchor part 511 is caught in gaps **10*b* between particles 10*a*, which constitute the core 10. More specifically, the anchor part 511 has a mesh pattern. In other words, the anchor part 511 branches off in different directions. The particles 10*a* constituting the core 10 may, for example, be in the form of magnetic powder or non-magnetic powder. The anchor part 511 exhibits strong adhesion to the core 10, and the first terminal electrode 31 is more securely fixed to the core 10** accordingly.

Figure 6:
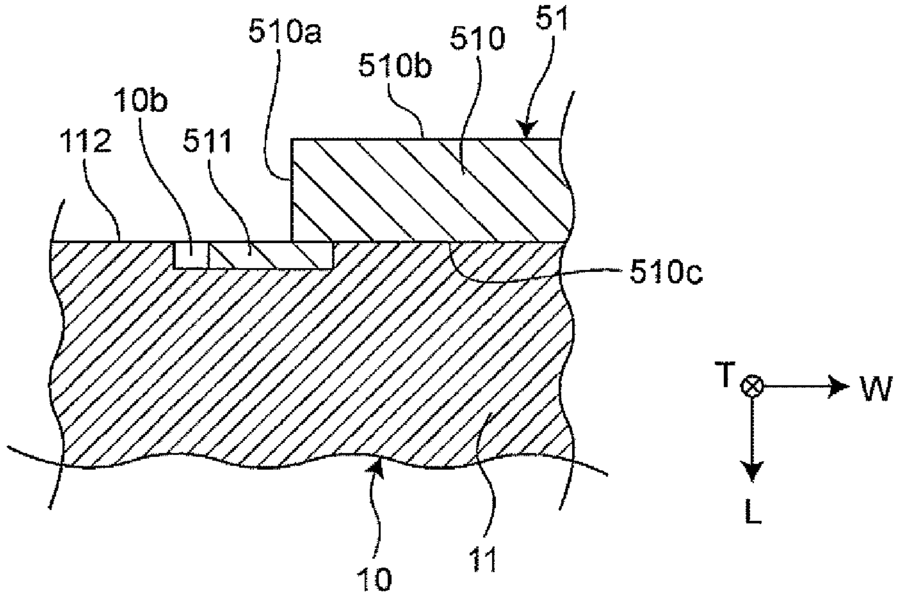
FIG. 6 is a sectional view taken along line C-C in FIG. 4.

FIG. 6 is a sectional view taken along line C-C in FIG. 4. For convenience of illustration, the particles **10*a* constituting the core 10 are omitted from FIG. 6 to show the gap 10*b* between the particles 10*a***.

As illustrated in FIGS. 5 and 6, the anchor part 511 is caught in the gaps **10*b* between the particles 10*a* exposed at a surface of the core 10 (i.e., the outer end surface 112 of the first flange 11). The gaps 10*b* herein refer to grooves located between the particles 10*a* and having a width of about 6 μm or more. Each gap 10*b* is at a level below the surface of the core 10 (i.e., below the outer end surface 112 of the first flange 11). That is, each gap 10*b* is at a level below the tops of the particles 10*a* that are adjacent to each other with the gap 10*b* therebetween. The anchor part 511 extends outside a peripheral surface 510*a* of the electrode main body part 510 when viewed in the thickness direction of the electrode main body part 510. The thickness direction of the electrode main body part 510 is orthogonal to the surface of the core 10 having the electrode main body part 510 disposed thereon. The thickness direction of the electrode main body part 510 in the present embodiment is orthogonal to the outer end surface 112 of the first flange 11** and coincides with the L direction.

With the anchor part 511 extending outside the peripheral surface **510*a* of the electrode main body part 510, at least part of an interface between the electrode main body part 510 and the core 10 is covered by the anchor part 511 from the side on which the peripheral surface 510*a* of the electrode main body part 510 is located. The anchor part 511 in the present embodiment covers at least part of an interface between a lower surface 510*c* of the electrode main body part 510 and the outer end surface 112 of the first flange 11. As the second layer 52, a plating layer may be formed on the electrode main body part 510 of the first layer 51 in such a way as to reduce the possibility that a plating solution flowing along the peripheral surface 510*a* of the electrode main body part 510 will infiltrate the interface between the electrode main body part 510 and the core 10. As a result, the occurrence of solder popping or other mounting defects is reduced such that the electrode main body part 510 is less likely to come off the core 10**.

Referring to FIG. 4, the anchor part 511 extends along at least part of the peripheral surface **510*a* of the electrode main body part 510 when viewed in the thickness direction of the electrode main body part 510. Alternatively, the anchor part 511 may extend all around the peripheral surface 510*a* of the electrode main body part 510. This approach further reduces the possibility that the plating solution flowing along the peripheral surface 510*a* of the electrode main body part 510 will infiltrate the interface between the electrode main body part 510 and the core 10**.

Referring to FIG. 6, the anchor part 511 is at a level below an upper surface **510*b* of the electrode main body part 510 in the thickness direction of the electrode main body part 510. The upper surface 510*b* is located on the upper side in the thickness direction of the electrode main body part 510. The upper surface 510*b* of the electrode main body part 510 is located opposite the lower surface 510*c*, which faces the outer end surface 112. The anchor part 511 at a level below the upper surface 510***b* of the electrode main body part 510 adds no extra thickness to the outer end surface electrode portion 50.

The anchor part 511 is preferably at a level below the surface of the core 10 in the thickness of the electrode main body part 510. The anchor part 511 in the present embodiment is at a level below the outer end surface 112 of the first flange 11. More specifically, the anchor part 511 is at the lower surface 510*c* of the electrode main body part 510. The anchor part 511 at a level below the outer end surface 112 of the first flange 11 adds no extra planar dimension to the outer end surface electrode portion 50, which is at a level above the outer end surface 112 of the first flange 11. This is advantageous is that a solder fillet is kept from spreading when the coil component 1 is mounted onto a mounting substrate. The footprint of the coil component 1 may be reduced accordingly.

In some embodiments, the anchor part 511 may be at the peripheral surface 510*a* of the electrode main body part 510. It is only required that the anchor part 511 be at a level below the upper surface 510*b* of the electrode main body part 510. Alternatively, the anchor part 511 may include sections at the peripheral surface 510*a* of the electrode main body part 510 and sections at the lower surface 510*c* of the electrode main body part 510. These sections at the lower surface 510*c* of the electrode main body part 510 include sections (not illustrated) connected to the lower surface 510*c* of the electrode main body part 510 and located in regions covered with the lower surface 510*c* of the electrode main body part 510 as well as sections connected to the lower surface 510*c* of the electrode main body part 510 and extending outside the peripheral surface 510*a* of the electrode main body part 510. In other words, there are gaps in a region being part of the outer end surface 112 of the first flange 11 and being in contact with the lower surface 510*c* of the electrode main body part 510. The anchor part extends in these gaps, which are denoted by 10*b*.

Figure 7A:
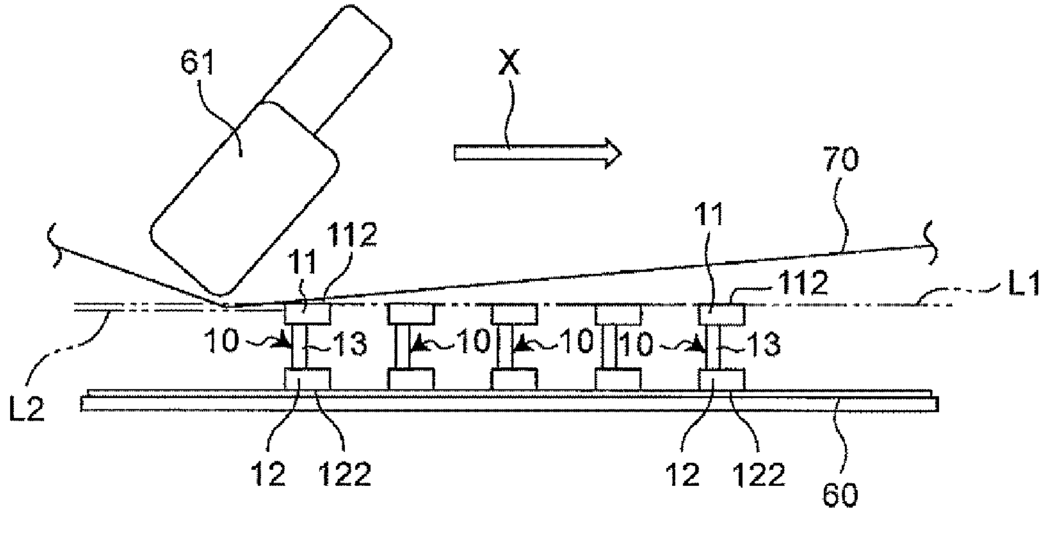
FIG. 7A is a simplified overall view for explanation of screen printing.
Figure 7B:
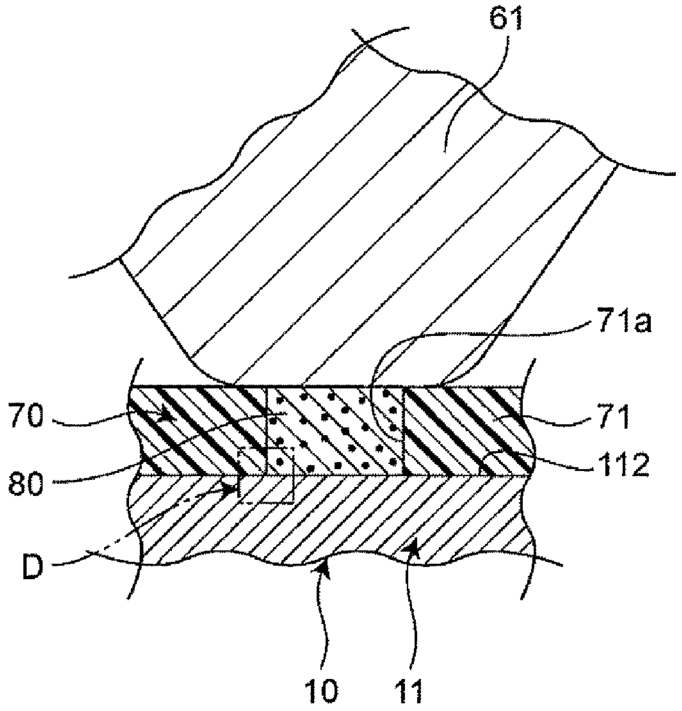
FIG. 7B is a partial enlargement of FIG. 7A.
Figure 8A:
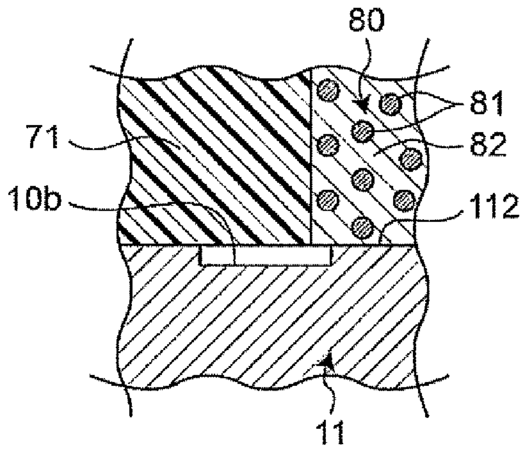
FIG. 8A is an enlarged view of a section denoted by D in FIG. 7B and is provided for explanation of a procedure for forming an anchor part.
Figure 8B:
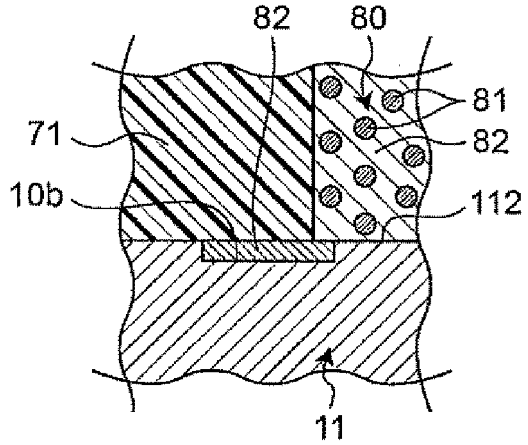
FIG. 8B is an enlarged view of the section denoted by D in FIG. 7B and is provided for explanation of the procedure for forming an anchor part.
Figure 8C:
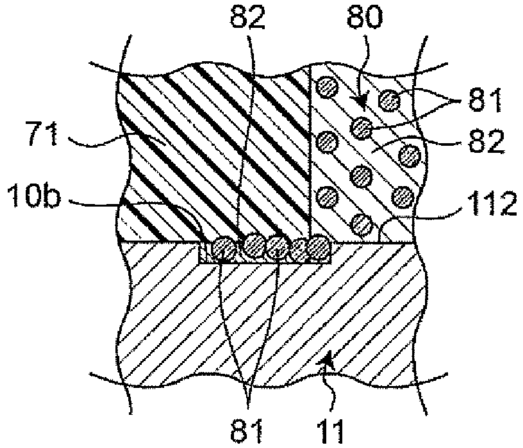
FIG. 8C is an enlarged view of the section denoted by D in FIG. 7B and is provided for explanation of the procedure for forming an anchor part.

The following describes a method for forming the anchor part 511 of the outer end surface electrode portion 50 with reference to FIGS. 7A, 7B, 8A, 8B, and 8C. FIG. 7A is a simplified overall view for explanation of screen printing. FIG. 7B is a partial enlargement of FIG. 7A. FIGS. 8A to 8C are enlarged views of a section denoted by D in FIG. 7B.

Referring to FIG. 7A, the cores 10 are placed on a substrate 60. Each core 10 is placed in such a manner that the outer end surface 122 of the second flange 12 is in contact with the substrate 60. In this state, the outer end surface 112 of the first flange 11 faces upward.

A conductive paste is then applied to the outer end surface 112 of the first flange 11 by screen printing, where a squeegee 61 is moved in an X direction while being pressed against a mask 70. The printing is performed while the vertical position of the squeegee 61 is adjusted. More specifically, the squeegee 61 is pressed so as to reach a second position L2, which is at a level below a first position L1. The first position L1 and the outer end surface 112 of the first flange 11 are located in the same plane. Referring to FIG. 7B, the mask 70 includes an emulsion 71, which has a hole 71*a*. The hole 71*a* is filled with a conductive paste 80, which is pushed into the outer end surface 112 of the first flange 11 by using the squeegee 61.

Referring to FIG. 8A, the gap 10*b* between the particles 10*a* in the outer end surface 112 of the first flange 11 is hollow before the application of pressure with the squeegee 61. Referring to FIG. 8B, a solvent 82 contained in the conductive paste 80 flows into the gap 10*b* through the application of pressure with the squeegee 61. Referring to FIG. 8C, conducting particles 81 (e.g., Ag particles) contained in the conductive paste 80 are then carried along the flow of the solvent 82 and enter the gap 10*b*. That is, through the application of pressure on the conductive paste 80 with the squeegee 61, the conducting particles 81 are drawn into the gap 10*b* in a manner so as to follow the solvent 82. In a subsequent firing process, the conducting particles 81 in the gap 10*b* are fired and formed into the anchor part 511.

As an alternative to applying pressure with the squeegee 61, increasing the printing speed at which the squeegee 61 is moved or reducing the viscosity of the conductive paste 80 will help carry the conducting particles 81 along the flow of the solvent 82 into the gap 10*b*.

Although the first layer 51 (the electrode main body part 510 and the anchor part 511) of the outer end surface electrode portion 50 in the embodiment described above is formed by screen printing, the first layer 51 may be formed in any other process that enables forming of the anchor part 511. For example, the conductive paste may be applied by using a dispenser.

Second Embodiment

Figure 9:
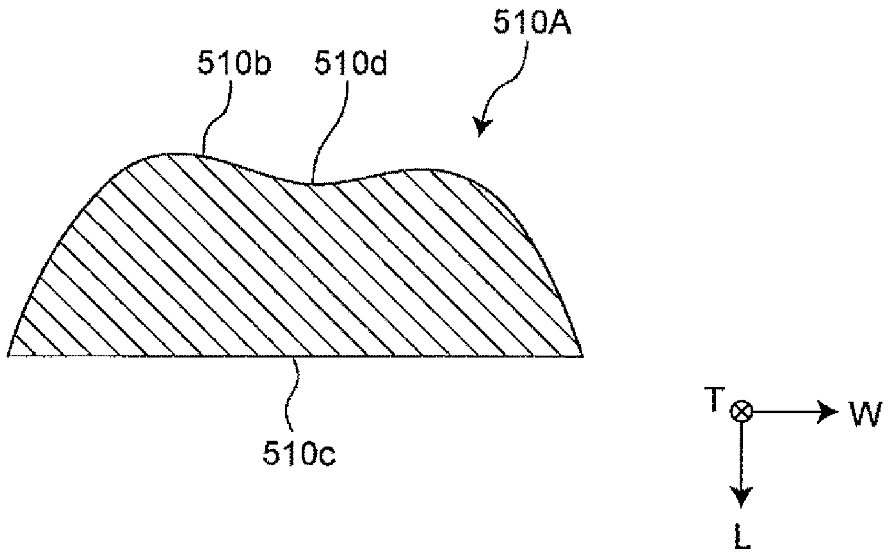
FIG. 9 is a sectional view of an electrode main body part in a second embodiment.

FIG. 9 is a sectional view of an electrode main body part in a second embodiment. The difference between the first embodiment and the second embodiment is in the shape of the electrode main body part and will be described below. The configuration in the second embodiment is otherwise identical to the configuration in the first embodiment. Each element in the first embodiment and the corresponding element in the second embodiment are denoted by the same reference sign and will not be further elaborated here.

FIG. 9 illustrates an electrode main body part 510A. The upper surface 510*b* is located on the upper side in the thickness direction of the electrode main body part 510A and has a recess 510*d*. The recess in the upper surface 510*b* adds an extra surface area to the upper surface 510*b* of the electrode main body part 510A. As the second layer, a plating layer may be formed on the electrode main body part 510A of the first layer. The upper surface 510*b* of the electrode main body part 510A has a better chance of contacting the medium in a plating solution, thus enabling a reduction in plating time. Furthermore, the adhesion of the plating layer to the electrode main body part 510A is enhanced such that the plating layer will not easily come off.

The recess 510*d* in the upper surface 510*b* of the electrode main body part 510A may be formed in the following manner. A mesh consisting of warp threads and weft threads may, for example, be used as a mask for screen printing. During screen printing, a point at which a warp thread and a weft thread intersect each other is brought into contact with an upper surface of a conductive paste such that a recess is formed on the upper surface of the conductive paste.

The present disclosure is not limited to the embodiments described above, and design changes may be made within a range not departing from the spirit of the present disclosure. For example, the features of the first embodiment and the features of the second embodiment may be implemented in various combinations.

In the embodiments above, the coil component includes two wires. In some embodiments, the coil component may include one wire or may include three or more wires. The coil component in the first embodiment is intended as a common mode choke coil. With wires being wound around the winding core, the coil component may be used as a wire-wound coil of a transformer or a coupled inductor.

In the embodiments above, each flange is provided with two terminal electrodes. In some embodiments, each flange may be provided with one terminal electrode. As in the embodiments above, each terminal electrode includes the bottom surface electrode portion and the outer end surface electrode portion. Alternatively, each flange may be provided with three or more terminal electrodes.

In the embodiments above, each terminal electrode includes the bottom surface electrode portion and the outer end surface electrode portion. In some embodiments, each terminal electrode may include the bottom surface electrode portion or the outer end surface electrode portion. Alternatively, each terminal electrode may include, in addition to the bottom surface electrode portion and the outer end surface electrode portion, a top surface electrode portion disposed on the top surface of the flange and connected to the outer end surface electrode portion. Whatever the case may be, it is only required the electrode main body part and the anchor part be included in the terminal electrode. More specifically, it in only required that the electrode main body part and the anchor part be included in at least one of the bottom surface electrode portion, the outer end surface electrode portion, and the top surface electrode portion.

In the embodiment above, the bottom end surface electrode portion and the outer end surface electrode portion include their respective first layers and their respective second layers. In some embodiments, the bottom end surface electrode portion and the outer end surface electrode portion may include their respective first layers only. In the embodiments above, the first layer of the outer end surface electrode portion includes the electrode main body part and the anchor part. In some embodiments, the first layer of the bottom surface electrode portion may include the electrode main body part and the anchor part.

While preferred embodiments of the disclosure have been described above, it is to be understood that variations and modifications will be apparent to those skilled in the art without departing from the scope and spirit of the disclosure. The scope of the disclosure, therefore, is to be determined solely by the following claims.

What is claimed is:

1. A coil component comprising:

a core including a winding core and a pair of flanges, each flange of the pair of flanges being disposed on a corresponding one of two ends of the winding core;

terminal electrodes at the flanges; and a wire wound around the winding core, two ends of the wire being electrically connected to the respective terminal electrodes, wherein the terminal electrodes each include an electrode main body part and an anchor part that extends from the electrode main body part and is lodged in the core; and the anchor part extends outside an external peripheral surface of the electrode main body part, the electrode main body part being external to the flange when viewed in a thickness direction of the electrode main body part.

2. The coil component according to claim 1, wherein the anchor part is caught in gaps between particles constituting the core.

3. The coil component according to claim 2, wherein the anchor part has a mesh pattern.

4. The coil component according to claim 1, wherein the anchor part is at a level below an upper surface of the electrode main body part in the thickness direction of the electrode main body part, the upper surface being located on an upper side in the thickness direction of the electrode main body part.

5. The coil component according to claim 1, wherein the anchor part is at a level below a surface of the core in the thickness direction of the electrode main body part.

6. The coil component according to claim 1, wherein an upper surface of the electrode main body part has a recess, the upper surface being located on an upper side in a thickness direction of the electrode main body part.

7. The coil component according to claim 1, wherein the flanges each have an inner end surface facing the winding core and an outer end surface opposite in direction to the inner end surface, each of the terminal electrodes includes an outer end surface electrode portion on the outer end surface of a corresponding one of the flanges, and the outer end surface electrode portion includes the electrode main body part and the anchor part.

8. The coil component according to claim 7, wherein the outer end surface electrode portion includes a first layer and a second layer, the first layer being in contact with the core and being overlaid with the second layer, and the first layer includes the electrode main body part and the anchor part.

9. The coil component according to claim 2, wherein an upper surface of the electrode main body part has a recess, the upper surface being located on an upper side in a thickness direction of the electrode main body part.

10. The coil component according to claim 3, wherein an upper surface of the electrode main body part has a recess, the upper surface being located on an upper side in a thickness direction of the electrode main body part.

11. The coil component according to claim 4, wherein an upper surface of the electrode main body part has a recess, the upper surface being located on an upper side in a thickness direction of the electrode main body part.

12. The coil component according to claim 5, wherein an upper surface of the electrode main body part has a recess, the upper surface being located on an upper side in a thickness direction of the electrode main body part.

13. The coil component according to claim 2, wherein the flanges each have an inner end surface facing the winding core and an outer end surface opposite in direction to the inner end surface, each of the terminal electrodes includes an outer end surface electrode portion on the outer end surface of a corresponding one of the flanges, and the outer end surface electrode portion includes the electrode main body part and the anchor part.

14. The coil component according to claim 3, wherein the flanges each have an inner end surface facing the winding core and an outer end surface opposite in direction to the inner end surface, each of the terminal electrodes includes an outer end surface electrode portion on the outer end surface of a corresponding one of the flanges, and the outer end surface electrode portion includes the electrode main body part and the anchor part.

15. The coil component according to claim 5, wherein the flanges each have an inner end surface facing the winding core and an outer end surface opposite in direction to the inner end surface, each of the terminal electrodes includes an outer end surface electrode portion on the outer end surface of a corresponding one of the flanges, and the outer end surface electrode portion includes the electrode main body part and the anchor part.

16. The coil component according to claim 4, wherein the flanges each have an inner end surface facing the winding core and an outer end surface opposite in direction to the inner end surface, each of the terminal electrodes includes an outer end surface electrode portion on the outer end surface of a corresponding one of the flanges, and the outer end surface electrode portion includes the electrode main body part and the anchor part.

* * * * *